Patented Mar. 28, 1944

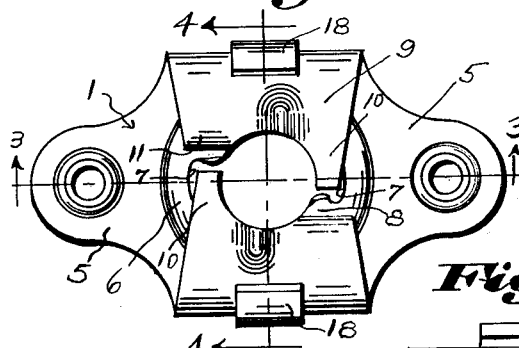
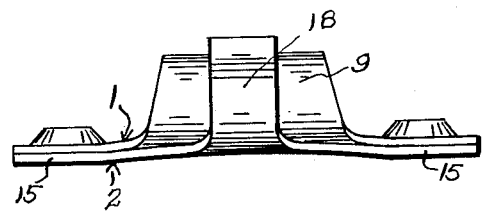
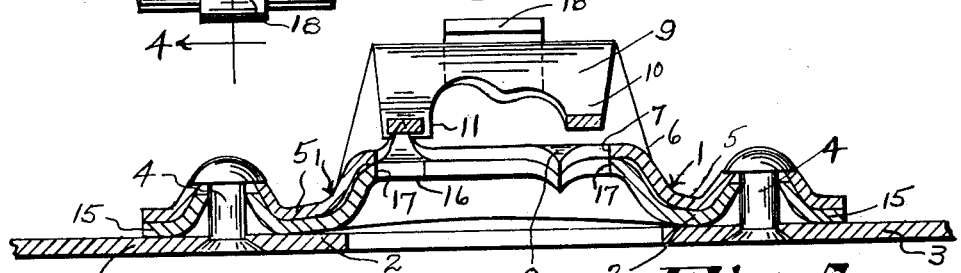
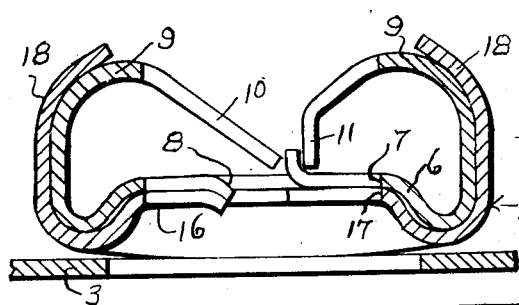
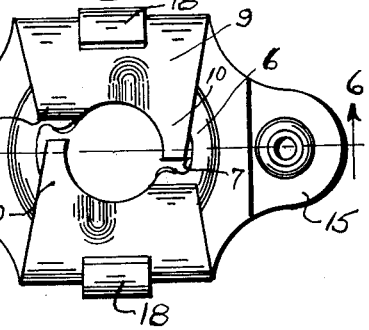
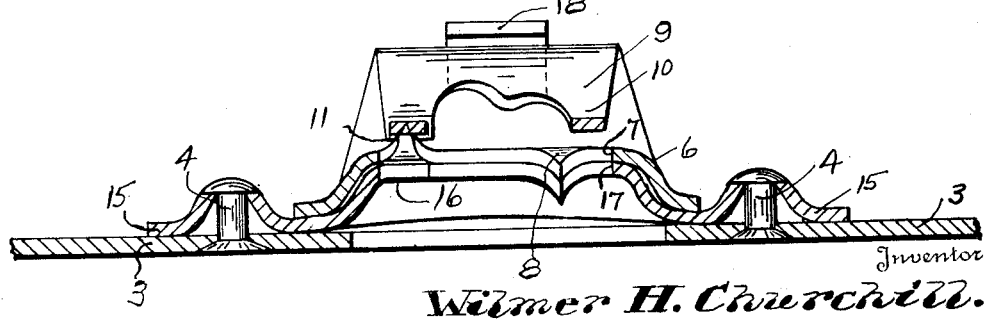

2,345,326

UNITED STATES PATENT OFFICE 2,345,326

REINFORCED FASTENER SOCKET MEMBER

Wilmer H. Churchill, Saugus, Mass., assignor to United-Carr Fastener Corporation, Cambridge, Mass., a corporation of Massachusetts Application April 1, 1943, Serial No. 481,479

9 Claims. (Cl. 24—221)

The present invention relates to fastener members of the rotary operative type and installations thereof and aims generally to improve the socket member of such fastener installations.

Such fastener installations comprise a socket or female fastener member attached to one of the parts to be connected, which socket member is formed with an apertured portion spaced from said part and adapted to receive and be interlocked with a rotary locking stud mounted in another part to be detachably connected to the first-named part.

Such fasteners are conveniently used for detachably connecting aircraft cowling sheets, and in modern high speed aircraft air pressure tending to separate the cowling sheets is very great, and is considerably higher than the pressure to which the fastener is initially locked, with the result that the increased pressure tends to crush the raised portion of the socket member, permitting separation of the plates.

One of the principal objects of my invention is the provision of a fastener device comprising a plate means having a centrally outwardly dished apertured portion adapted to receive and provide a seat for the locking stud under initial locking pressure, combined with a reinforcing member normally assembled with said socket member in nested relation therewith, to engage said socket member and prevent further deflection of the dished portion under an additional tension load, for example such as may be created by wind pressure acting between the cowling sheets.

A further object of the invention is the provision of a two-part socket member of the character above described which is of simple construction and readily pre-assembled so as to be attachable to the supporting part as a single unit with a minimum of labor.

Illustrative of the invention, reference is made to the accompanying drawing illustrating preferred embodiments of the invention, and in which:

Fig. 1 is a plan view of my improved fastener member;

Fig. 2 is a side view thereof;

Fig. 3 is an enlarged longitudinal central sectional view thereof taken on the line 3—3 of Fig. 1, the fastener being shown attached to a support;

Fig. 4 is an enlarged transverse sectional view thereof taken on the line 4—4 of Fig. 1, the fastener being shown attached to a support;

Fig. 5 is a plan view of a modified form of the invention; and

Fig. 6 is a vertical longitudinal sectional view thereof as taken on the line 6—6 of Fig. 5, the fastener being shown attached to a support.

Referring to the drawing, the invention comprises a two-part fastener member comprising a fastener plate 1 and a reinforcing plate 2 which are preferably pre-assembled so that they may be attached as a unit to an apertured supporting part 3 by means of suitable fastening means, for example rivets 4 (Fig. 3).

The plate 1 may be of any approved construction providing an elongated base 5, an outwardly dished central portion or embossment 6 apertured as at 7 to permit the passage of the cooperating locking stud (not shown) therethrough. The marginal edge of the dished portion 6 on opposite sides of the aperture 7 are inclined to provide cam surfaces 8 for receiving and tensioning the stud upon rotation thereof.

For convenience of illustration, the fastener plate 1 may conform in construction to the fastener shown in the patent to Bedford No. 2,306,928, dated December 29, 1942. Such fastener member comprises a base portion 5 formed with an outwardly dished embossment 6 having a central aperture 7 which may be formed with radial elongations to receive the stud and radial arms thereof (not shown), the marginal edge portions at the aperture 7 presenting upwardly sloping cam seats 8. Advantageously resilient wings 9 extending from the side edges of the base 5 extend upwardly and inwardly over the seats 8, the inner edge thereof being notched to permit passage of the end of the rotary stud. One side of the wings 9 is preferably downwardly inclined and disposed above the radial elongations, as at 10, so as to engage the radial arms of the stud. Another portion of each wing may be formed with a depending extension 11 extending toward the seat 8 to act as a stop for the rotary stud, all of which is described in said Bedford Patent No. 2,306,928.

In the case of one-part socket fastener members, for example as disclosed in the Bedford patent, the cooperating parts of the fastener are locked together under an initial tension as a result of rotating the locking stud to locked position on the cam seat. Although this is quite satisfactory for many installations, it has been found that the fastener is subjected to additional tension in high speed aircraft as a result of high wind pressure acting between the cowling sheets, tending to separate the sheets. As the fastener parts are in locked position the additional tension tends to deflect the dished portion of the socket fastener plate.

To overcome the above stated objection I provide a supporting and reinforcing member 2 preferably comprising an elongated base plate 15 of similar shape to the base plate 5 and formed with an outwardly dished central portion or embossment 16 of corresponding shape and curvature to the dished central portion 6 of the plate 1 so that the two plates 1 and 2 may be associated together in nested relationship. The outwardly dished central portion 16 of the plate 2 is formed with a central opening 17 in registry with the opening 7 to permit the passage of the stud therethrough.

Preferably the supporting or reinforcing plate 2 is provided with means embracing portions of the socket member 1 so that the two members 1 and 2 may be pre-assembled and attached to the part 3 as a unit. One simple manner of accomplishing this result is to provide lateral extensions 18 on opposite sides of the plate 2 adapted to extend alongside and over portions of the socket member 1, for example the central portion of the wings 9. Preferably the extensions 18 do not tightly engage the wings 9 or underlying portions of the member 1, but advantageously a clearance of a few thousandths of an inch is provided so that the socket member 1 may adjust itself to a position where it bears upon the reinforcing member 2, especially when a stud is locked with the socket member.

The provision of the slight clearance as above described results in the socket member 1 being initially loosely attached to the reinforcing plate 2 (before attachment to a support) and has limited shiftability thereon. This may be used to advantage by cutting off the terminal ends of the socket member 1 and riveting or otherwise fastening only the reinforcing member 2 to the support 3 as shown in Figs. 5 and 6. In this case the socket member has limited shiftability, facilitating ready alignment of the parts of the fastener when being engaged.

I have chosen to illustrate the principles of my invention in connection with two forms of rotary operative devices, but it is understood that the theory of my invention could be applied to devices other than those specifically illustrated and described.

Although I have illustrated and described preferred forms of my invention I do not wish to be limited thereby because the scope of my invention is best defined by the following claims.

I claim:

1. In a rotary operative fastener for detachably connecting a plurality of parts including a socket member attached to one part and a rotary locking stud mounted in another part and adapted to cooperate with said socket, said socket member comprising a plurality of superimposed plates each having outwardly dished portions in nested relationship and apertured to permit the passage of the locking stud therethrough, the marginal edges of the apertured dished portion of the outermost plate being cam-shaped for interlocking engagement with the locking stud and the marginal edges of the apertured dished portion of the innermost plate engaging and reinforcing said dished portion of the outermost plate and resisting deflection of the outermost plate under tension load.

2. In a rotary operative fastener for detachably connecting a plurality of parts including a socket member attached to one part and a rotary locking stud mounted in another part and adapted to cooperate with said socket, said socket member comprising a plurality of superimposed plates each having similarly outwardly dished portions in nested relationship and correspondingly apertured to permit the passage of the locking stud therethrough, the marginal edges of the apertured dished portion of the outermost plate being cam-shaped for interlocking engagement with the locking stud, and the marginal edges of the apertured dished portion of the innermost plate engaging and reinforcing said dished portion of the outermost plate and resisting deflection of the outermost plate under tension load.

3. In a rotary apertured fastener for detachably connecting a plurality of parts including a socket member attached to one part and a rotary locking stud mounted in another part adapted to cooperate with said socket, said socket member comprising a plurality of similarly outwardly dished plates having central apertures to permit the passage of the locking stud therethrough and assembled together for limited slight relative axial movement, the marginal edges of the apertured dished portion of the outward plate being cam-shaped for engagement and slight deflection by said locking stud upon rotation thereof, and the dished portion of the innermost plate engaging and supporting the dished portion of the outermost plate when under locked tension and reinforcing the dished portion of said outer plate against further deflection under additional tension load.

4. In a rotary operative fastener for detachably connecting a plurality of parts including a socket member attached to one part and a rotary locking stud mounted in another part and adapted to cooperate with said socket, said socket member comprising a plurality of similarly outwardly dished plates having central apertures to permit the passage of the locking stud therethrough, means on said innermost plate overlying portions of the outermost plate securing said plates in assembled relation for limited slight axial movement relative to each other, the marginal edges of the apertured dished portion of the outermost plate being cam-shaped for engagement and slight deflection by said locking stud upon rotation thereof, and the dished portion of the innermost plate engaging and supporting the dished portion of the outermost plate when under locked tension and reinforcing the dished portion of said outer plate against further deflection under additional tension load.

5. In a rotary operative fastener for detachably connecting a plurality of parts including a socket member attached to one part and a rotary locking stud mounted in another part and adapted to cooperate with said socket, said socket member comprising a plurality of similarly outwardly dished plates having central apertures to permit the passage of the locking stud therethrough, extensions integral with the side edges of said innermost plate overlying portions of the outermost plate securing said plates in assembled relation for limited slight axial movement relative to each other, the marginal edges of the apertured dished portion of the outermost plate being cam-shaped for engagement and slight deflection by said locking stud upon rotation thereof and the dished portion of the innermost plate engaging and supporting the dished portion of the outermost plate when under locked tension and reinforcing the dished portion of said outer plate against further deflection under additional tension load.

6. In a rotary operative fastener for detachably connecting a plurality of parts including a socket member attached to one part and a rotary locking stud mounted in another part adapted to cooperate with said socket, said socket member comprising a plurality of similarly outwardly dished elongated plates having central apertures to permit the passage of the locking stud therethrough and assembled together for limited slight relative axial movement, the marginal edges of the apertured dished portion of the outermost plate being cam-shaped for engagement and slight deflection by said locking stud upon rotation thereof, and the dished portion of the innermost plate engaging and supporting the dished portion of the outermost plate when under locked tension and reinforcing the dished portion of said outer plate against further deflection under additional tension load, the end portions of both plates being similarly apertured, and fastening means extending through the apertures and portions of both plates to secure the assembled plates of the socket member to its supporting part.

7. In a rotary apertured fastener for detachably connecting a plurality of parts including a socket member attached to one part and a rotary locking stud mounted in another part and adapted to cooperate with said socket, said socket member comprising a plurality of similarly outwardly dished plates having central apertures to permit the passage of the locking stud therethrough, means on said innermost plate overlying portions of said outermost plate for securing said plates in limited axial and lateral shifting movement relative to each other, the marginal edges of the apertured dished portion of the outermost plate being cam-shaped for engagement and slight deflection by said locking stud upon rotation thereof, and the dished portion of the innermost plate engaging and supporting the dished portion of the outermost plate when under locked tension and reinforcing the dished portion of said outer plate against further deflection under additional tension load.

8. In a rotary operative fastener for detachably connecting a plurality of parts including a socket member attached to one part and a rotary locking stud mounted in another part and adapted to cooperate with said socket, said socket member comprising a plurality of similarly outwardly dished plates having central apertures to permit the passage of the locking stud therethrough, extensions integral with the side edges of said innermost plate overlying portions of said outermost plate for securing said plates in limited axial and lateral shifting movement relative to each other, the marginal edges of the apertured dished portion of the outermost plate being cam-shaped for engagement and slight deflection by said locking stud upon rotation thereof, and the dished portion of the innermost plate engaging and supporting the dished portion of the outermost plate when under locked tension and reinforcing the dished portion of said outer plate against further deflection under additional tension load.

9. In a rotary operative fastener for detachably connecting a plurality of parts in one of which is mounted a rotary locking stud, a two-part socket member attached to the other part to receive and interlockingly engage said stud, said fastener comprising pre-assembled superimposed plates each having a similarly outwardly dished central portion apertured to permit the passage of said stud, the outer plate being formed with cam and locking means adapted to receive and interlock with said stud upon rotation thereof causing slight deflection of the dished portion of said outermost plate under vertical locking tension, the underlying dished portion of the innermost plate engaging the dished portion of the outermost plate when the fastening parts are in locked position and reinforcing the latter against further deflection under additional tension load.

WILMER H. CHURCHILL.